(12) United States Patent
Chirieleison, Jr. et al.

(10) Patent No.: US 6,744,436 B1
(45) Date of Patent: Jun. 1, 2004

(54) VIRTUAL REALITY WAREHOUSE MANAGEMENT SYSTEM COMPLEMENT

(76) Inventors: Anthony Chirieleison, Jr., P.O. Box 279, Tyrone, NM (US) 88065; Tony Chirieleison, Sr., P.O. Box 279, Tyrone, NM (US) 88065

( * ) Notice: Subject to any disclaimer, the term of this patent is extended or adjusted under 35 U.S.C. 154(b) by 0 days.

(21) Appl. No.: 09/700,337

(22) PCT Filed: May 25, 1999

(86) PCT No.: PCT/US99/11569

§ 371 (c)(1),
(2), (4) Date: Nov. 14, 2000

(87) PCT Pub. No.: WO99/61967

PCT Pub. Date: Dec. 2, 1999

(51) Int. Cl.$^7$ ............................................. G06T 15/10
(52) U.S. Cl. ....................................... 345/427; 345/419
(58) Field of Search ................................ 345/419, 420, 345/427, 649, 672, 473, 474, 475

(56) References Cited

U.S. PATENT DOCUMENTS 6,215,498 B1 * 4/2001 Filo et al. .................... 345/419

OTHER PUBLICATIONS

Mine et al. "Moving Objects in Space: Exploiting Proprioception In Virtual–Environment Interaction" SIGGRAPH 1997.*

Smart, Don, et al., "The Design of Computer Generated Images: The Research and Engineering Simulation Laboratory Problem. It's More Than What Meets the Eye". AIAA 22$^{nd}$ Aerospace Sciences Meeting, Paper No. AIAA–84–0556, Jan. 1984, Reno, Nevada.

Smart, Don, et al., "The Generation of Three–Dimensional Data Bases Using a Building Block Approach". General Dynamics Corporation, 1984.

Chirieleison, Anthony C., Sr. "Total Sensor Simulation Using Magic". Preseneted at the IMAGE IV Conference, Phoenix, Arizona, Jun. 23–26, 1987.

Chirieleison, Tony, "Who's Zooming Who?". Presented at the IMAGE V Conference, Phoenix, Arizona, Jun. 19–23, 1990.

Holmes, Brian, " Life Cycle Implications of Using 'Open Source' Scene Graph Software". The IMAGE Society, Inc., 2003.

Abascal, Jr., Roberto, et al., "An Application in Simplicity: The Building Block Technique of Terrain Data Base Generation". Proceedings of 1986 Summer Society of Computer Simulation, Bell helicopter Textron, Inc.

* cited by examiner

Primary Examiner—Almis R. Jankus
(74) Attorney, Agent, or Firm—Nath & Associates (57) ABSTRACT

An image generator system (5) with a warehouse database (3) that is integrated to an image generator system human interface (FIG. 6) (virtual reality) and integrated to a warehouse management system's (WMS) stock location system (FIG. 1). This software and hardware combination performs warehousing functions in a simple, visual, real time, non real time and three-dimensional environment. This computer combination is intended for organizations to more efficiently manage the warehousing process—especially by locating key positions. World famine can be reduced with the capabilities of visualizing locations within any warehouse. All industries that use warehouses can ultimately use this virtual reality warehouse management system complement to augment their distribution process. The combination of two previous technologies: that of Virtual Reality (real time 3D graphics) and the field of warehousing and warehouse management systems.

27 Claims, 5 Drawing Sheets

VIRTUAL REALITY WAREHOUSE MANAGEMENT SYSTEM COMPLEMENT

This application claims the benefit of Provisional Patent Application Ser. No. 60/086784, filed May 26, 1998 with the United States Patent and Trademark Office.

DESCRIPTION

1. Technical Field

This virtual reality warehouse management system complement (VR WMS complement) is an advance to the warehousing and logistics industry where image generating graphic board systems, visual computer generated warehouse databases, and other optional components of virtual reality (VR) are incorporated and integrated into the stock location systems of computerized warehouse management systems (WMSs) in order to manage warehouses better.

2. Background Art

1. Warehousing

Since people began the conglomeration of goods into buildings, they have relied on two major methods of warehousing, which had been in existence for thousands of years. The memory system and the stock location naming system and/or the combination of both. The memory system consists of having a person or group of people to keep a memory of location of stock and available spaces to place them. A stock location naming system identifies locations based on a system of symbols, numbers and letters. A notable example of early warehousing with a stock location system begins in Egypt when the Pharoah's servants kept track of stores of grains and wealth. However, both of these methods are complex, confusing and inefficient. Recently modern advances have greatly improved these ancient techniques. These include the incorporation of the stock location naming system by computer, and the use of audio technology and robot like automated warehousing systems. All these warehousing methods are discussed below.

a. Warehouse Manager(s) Without a Computerized WMS

Warehouse managers have difficulty relying solely on their own memory and/or a stock location system to keep track of stock keeping unit (SKU) locations and available space to place them—especially in the high volume of stock in modern warehouses. Even with two dimensional maps of the warehouse, limited success is achieved due to the dynamic three dimensional nature of a warehouse. Excessive amounts of paperwork produced by inventory data can sometimes confuse workers, even though they are necessary for the management of warehousing.

Recently, with the industrial revolution, warehouses have expanded into square miles, and the copious quantities of goods that are processed today have become increasingly difficult to manage with human memory techniques and a stock location naming system. The human memory system, in both ancient and modern times, has relied on one person or a group of people who has been employed at a warehouse for a long period of time and has accumulated a wealth of knowledge of warehouse locations. Even the most skilled warehouse manager has difficulty in keeping track of locations of stock and available spaces. Psychology studies have proven that the human mind can only retain 5 to 7 items at one time. In order to reduce confusion and better address modern warehousing, companies have no other recourse but to turn to the fast stock location accessing capabilities of computers.

b. Computerized Warehouse Management Systems (WMS)

Computerized WMS presently do not provide any other way of visualizing a warehouse besides using naming methods based on stock location systems. The naming conventions used in these WMS make the entire WMS difficult to use, maintain, and fully understand. This difficulty also limits WMS users to use any WMS to its fullest capabilities. Which in turn also limits the WMS designer from conceiving of new capabilities.

A numbering system based on a naming convention consisting of warehouse areas and stock locations that are placed on several sheets of paper or monitor fails to quickly and effectively convey this three dimensional SKU location information to the human mind as is needed in the complex and dynamic three dimensional optimum real time environment of warehousing. When very large number of locations must be accounted for very quickly, this process becomes tedious, slow and confusing. The numbers and letters that describe a location of stock or an available space to place goods are difficult to quickly decipher by even the most skilled warehouse worker especially when it needs to be done accurately and efficiently each time. Tediousness and inaccuracy can become commonplace in large volume and or complex warehousing. The naming method based on a written stock location system is very time consuming, difficult, and costly to labor hours, costly to warehouse building space etc. Warehousing performed with the help of computerized WMSs have phenomenally advanced the warehousing process by placing, monitoring, selecting, and shipping SKUs. However, these software systems need to supply SKU data to people to effectively warehouse. These systems based on a stock location naming system, give people locations of SKUs in the form of numbers and letters, such as STE7362-38. All major warehousing processes involve the need to know the location of goods. These processes include planning and design, receipt and placement, monitoring of stock picking SKUs for orders, and shipping SKUs. The human mind takes longer time to read a name like this: YFI-3894-F, than to read and understand a picture. A number based on a stock location naming system fails to quickly and effectively convey this three dimensional SKU location information to the human mind as is needed in the complex and dynamic environment of warehousing.

Software companies have provided systems specifically for the warehousing industry that access locations with a stock location naming system. Numerous software programs that are sold today have been widely used first in the early 1980s. A few of these warehouse management systems include but are not limited to the following table 1 as found in *Consumer Goods Manufacturer*, September/October 1998, an Edgell Publication, Vol 7 NO 5:

TABLE 1

| Company name | WMS name |
|---|---|
| Acacia Technologies | Warehouse Boss 6.0 |
| Adonix Transcomm | Tolas WMS 3.1 |
| AllPoints Systems. Inc. | AllPoints V6.0 |
| Ann Arbor Computer | PC/Aim V.4.0 |
| Applied Automation Techniques | AutoTrak 6.0 |

TABLE 1-continued

WMS

| Company name | WMS name |
| --- | --- |
| Cambar Software | Client Server Warehousing (CSW) v 1.10 Control II v 2.2 |
| Cantoc | CENSYS NT |
| Catalyst Int'l, Inc | Catalyst WMS 7.1 |
| Celerity Solutions, Inc | WMS 5.0 |
| Daly & Wolcott | A+, Version 3.02 |
| Data Collection Systems, Inc. | Wh. Advantage 4.2 |
| DataWorks Corporation | Avante, Vantage |
| DSA-Software | Foxware |
| Evcor | Warehouse Brain Nautilus |
| EXE Technologies | Exceed |
| Exeter/Kewill | Commander 2000 |
| Gateway | Warehouse Control System |
| Genco Distribution System | Doms v5.5 |
| Haushahn Systems and Engineers | Viaware WMS 4.3.6 |
| HK Systems Logistics Software | Stockmaster 4.4 |
| Interlink Technologies | WHSE-Link |
| JBA International | System 21 V 3.5.2 |
| JDA Software group, Inc. | Wh. Control Center V 1.1 |
| J.D. Edwards | WMS/A8.1 or B73.3 |
| Logility | Warehouse PRO 3.0 |
| Majure Data, Inc. | RF Navigator 8.0 |
| Malvern System, Inc. | The Malvern W.M.S. |
| Manhattan Associates, Inc. | PkMS 18.2 |
| McHugh Software International | DCSTRACS*, DMplus/TRACS* |
| Mincron Software System | MSS/WM V.1.4, MSS/WM V.3.2 |
| MK Group, an iBU of Computer Associates Intl. | MK- Logistics/8.0 |
| Montego System | WinWhere V. 3.0 |
| OMI International | Triceps |
| Optum, Inc. | Response SCE Suite Move WMS |
| QSSI | PowerHouse |
| Renaissance Software Inc. | IWMS V. 3.1 |
| Robocom Systems International | RIMS.2001 |
| RT Systems | RT Locator/WMS |
| ScanData Systems. Inc. | 8.0 |
| Sonica Software | Sonictrak V.3.1 |
| Summit Group | Logistics Pro |
| Tangible Vision Inc. | Imprimis 2.02 |
| Tecsys | Elite Series 6.1 |
| TRW-Logistics Execution System | |
| Uniteq | WMS 21 4.2 |
| Yantra Corporation | WMS Yantra |
| SAP | SAP R/3 Logistics modules, Warehouse Management (WM) |
| | BDM - MARC Material and Resource Control System |
| | DCSI WMS |
| | EDMS WMS |
| Royal 4 Systems | R4-WMS |
| | OnTime Shareware WMS |
| | Scarlett Development WMS |
| | Radcliffe WMS |
| | Wireless Warehouse |
| | Red Brick Warehouse VPT |
| | Integrated Warehousing Solutions IRMS WMS |
| ESKAY Corporation | Warehouse Rx WMS |
| Silver Creek Assoc. | SCAN TRAC WMS. |
| | Eagle WMS |
| | Renaissance WMS |
| | Logistics Data Systems |
| Peoplesoft Inc.. | Peoplesoft Logistics. Materials Management. Red Pepper |

These programs have greatly advanced the warehousing industry, modernizing it with available technology; however, these have been limited in delivering location information as a warehouseman must first read numbers and letters then interpret it into three dimensions. Hand Held Displays (HHDs) have been used with computerized WMS to augment the WMS's capabilities while a picker is at work on the floor of the warehouse. HHDs are lightweight systems with small screens that can be conveniently carried by hand. They have been used in warehousing to access and enter limited data into a computer via a 'windows' operating system that can be seen on the screen. Currently, only lists of names of the stock location system are presented to the user. These lists are still confusing even when a user is interpreting them at the stock site.

These WMSs have not fully addressed the needs of the warehousing and logistics industry. Even with the added benefits of two dimensional, readable query capability that is computerized many opportunities for error occur, costing the industry enormous amounts of money. The amount of labor time that is wasted, the misallocation of space, causing a new building to be constructed the needs of consumers are not met on time. With the aid of WMSs, response time to customers is faster, but it can be done even faster if goods are found immediately. There exists room for improvement in this industry to do things faster, cheaper and with less chaos.

c. Audio WMS Complements

Audio WMS complements interpret the written stock location system into audio that can be individually heard through headphones anywhere on the warehouse floor, on or off a forklift. These systems increase productivity by supplying this information while a warehouse worker is performing a tasks however, they only provide limited information within the time necessary to perform daily warehousing functions. In these audio systems, the current scene that the warehouseman is observing needs to be described in detail. This is an impossible task to do in words with the time given to perform daily warehousing. A common phrase describes this problem. It takes a thousand words to describe a picture.

d. Automatic WMS Complements

Automatic warehousing attempts to eliminate human functions on the floor of the warehouse. It attempts to eliminate all human errors and problems of human labor. These systems can work with a computerized WMS and some can work without one. These systems include, but are not limited to, Automatic Guided Vehicle Systems (AGVS) and Automatic Storage and Retrieval Systems (AS/RS). The AGVS is intended to effectively replace the warehouse material handling vehicle operator by automatically selecting specified stock. Some AGVS use optical systems to follow painted lines on the warehouse floor. AS/RS are incorporated into the warehouse shelving structure so that stock can be selected without human travel within aisles. Although labor has been reduced and efficient stacking methods have emerged, these advancements have come by an increase in cash requirements and a lack of dynamism. Technology that completely replaces a human is of a lessor form.

e. Non Real Time Warehouse Simulations

Warehouses have been visualized in a static non real time form providing an animated visual scene to promote conceptual thought on the design of a warehouse advancing the warehousing, logistics, distribution and supply chain industry. Non real time is defined as any graphics update rate below 1 HZ. It provides a computerized video of what a warehouse might look like. However, since these are animations, each picture needs a large amount of time to create. So within these visual scenes, one does not have the capability to choose what to see within the presented visual. Due to this limitation, the images are not capable of being instantaneously correlated with real warehouse events and truly be effective. These non real time warehouse simulations have not been integrated into warehouse management systems. Stock items cannot be individually selected from the mass of the warehouse and coordinate with the real events. Visual loading software assists in only a small limited aspect of warehousing. It's non real time form provides a limited amount of information, preventing it from performing other warehousing functions.

f. Additional Previous Warehouse Capability List

Even with these warehouse management techniques (among the most common being the combination of above sections a and b, less common the use of all above sections, a thru e), warehouse managers still have difficulty with and fail in:

a. Locating outdated and obsolete inventory. Locating current inventory without a problem of causing surplus stock production and wasteful redundant expenses.

b. Identifying available space within the warehouse and avoiding new warehouse construction. (Space is lost and wasted within partially empty bins that cannot be seen). Identifying space with accuracy according to precise three dimensional information as well as other parameters such as accessibility. Packing methods that optimally conserve available space.

c. Easily and quickly tracking stock movements that allow for faster delivery and an accurate system of handling customer returns.

d. Having the instant knowledge of the location of stock and its available space on a global basis.

e. Training warehouse workers in one language and in multiple languages in a short amount of time.

f. Control over manipulation of stock.

g. Informing various managers across the logistics infrastructure and departments of an organization of the instant and updated knowledge of locations of stock and available space for it in multiple warehouses in order to make general suggestions, plan future events and quickly respond to changes in a volatile market.

h. Providing workers the quick and accurate information to pick orders and place stock.

i. Providing workers information that will prevent them from getting lost in the warehouse and finding stock quickly by reducing travel time and once at the general location quickly selecting that stock.

j. Delegating tasks efficiently to workers due to not continually observing them.

k. Providing forklift and other material handling operators the ability to freely use their hands to safely operate their vehicles and locate stock at the same time. (When stock location system name printouts or computer screens are used operators are distracted from operation and must read the lists of stock locations).

l. Providing time to simply visually inspect the warehouse at frequent intervals to insure that proper protocols are met such as storage of items in certain places within given parameters. These parameters include hazardous materials and food stores, similarly requested items, security of materials, etc. The time taken to visually inspect the warehouse to ensure that SKUs are in the proper place by visually inspecting remote warehouses by organization leaders is extremely costly and time consuming).

m. Optimizing the use of trucking loads. Often trucks run empty due to non coordination of industry—when they could run full.

n. Superior coordination and communication between inter company units and between business to business organizations.

o. Superior understanding at all levels of the supply chain by everyone involved.

p. Verification of the WMS.

q. Planning and design of the most optimum warehouse design according to potential scenarios.

The previous capabilities of the warehousing industry and others are described in detail by James A. Tompkins and Dale Harmelink in their book, *The Distribution Management Handbook*, published by McGraw Hill in 1994.

2. Advanced Vehicle Systems and Simulation or Virtual Reality

Image generator systems (IGS), head up displays (HUD)s, head down displays (HDD). Head Mounted Displays (HMD)s and monitors have been used for military, aircraft, commercial aircraft flight system, commercial training, simulation, and other vehicle systems. Tank, automobile, aircraft and other vehicles have had simulators created for them with these components. Numerous articles have been written on this subject. One of them from *Aviation Week and Space Technology*, Simulators. Feb. 20, 1989 Pgs 57–70.

Recently, however, as U.S. military budget has decreased, aircraft flight system and training and simulation companies have searched other business ventures and this technology has been used for entertainment and games. This transfer of industry application has caused these technologies to be exposed to the media, which has named it 'Virtual Reality'. An article describing this technology in detail as 'Virtual Reality' outside of the aviation world was written by Ben Delaney, *Virtual Reality lands the job*. New Media, August 1994, pgs 40–48.

a. Monitors

Any device that can display or project information from a computer has been used in many applications of VR. These devices include but are not limited to flat panel displays, plasma displays. LEDs, matrix displays and many others. The monitor as well as other large screen projecting devices have been used in training to simulate real world views that would normally be seen from the cockpit or from an operator's station in any vehicle.

b. HDD (Head Down Displays)

Figure 7:
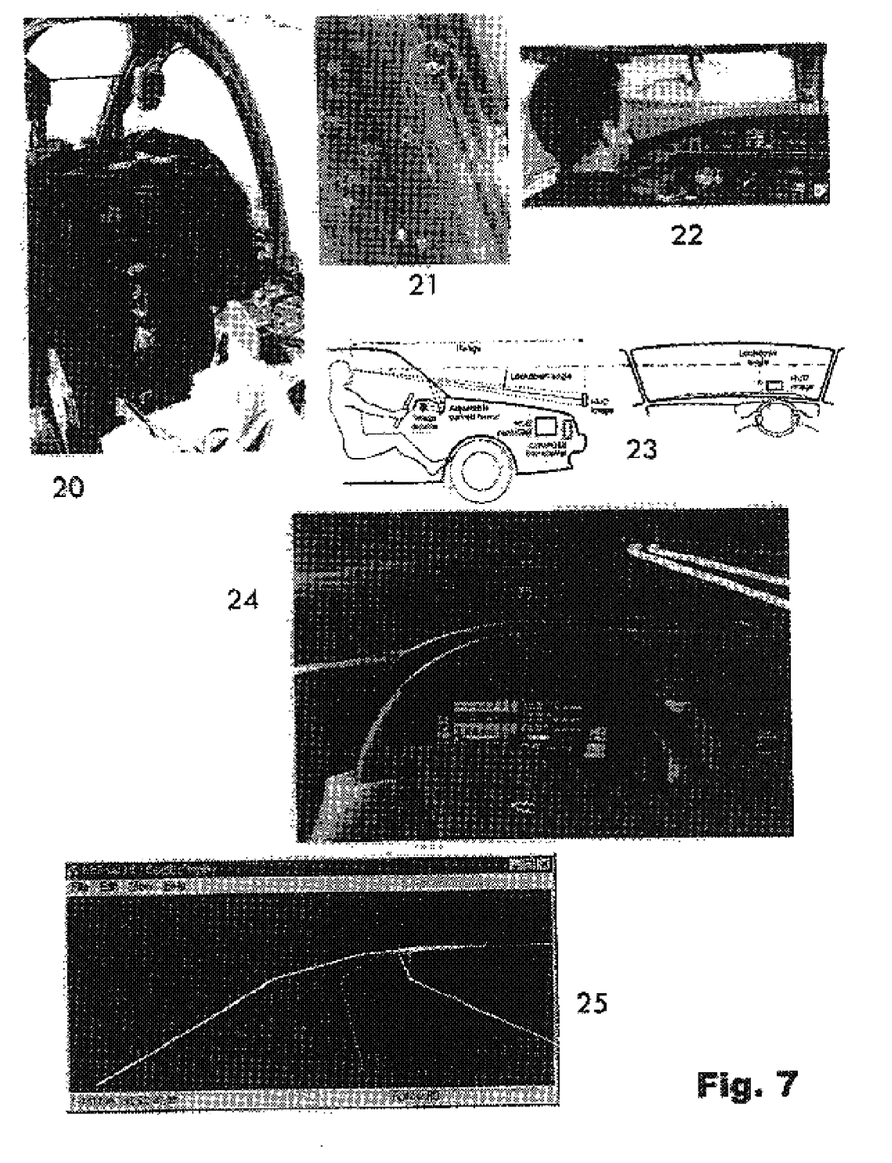
FIG. 7 shows various examples of head-up-display (HUD) and head-down-display (HDD) in a vehicle application.

In order to more easily control an aircraft or land vehicle, a pilot or other operator has had the use of HDD in the form of dials and cathode ray tubes (CRTs) that indicate speed, altitude and other important data. The HDD refers to any display device that is not mounted in a human operator's necessary field of view, but provides data for the human operator near a field of view. In FIG. 7, photo 20, photo 22, and photo 24 all show HDD within vehicles. Recently dials have been replaced with small monitors and other flat panel displays that indicate this same information and provide much more data to the operator. However, m an aircraft the pilot must move his head and eyes down from his flight path's field of view and refocus on the HDD within the vehicle. This process of refocusing on the HDD to obtain operating information of the outside world and then refocusing on flying the aircraft has been timed at nine seconds. Although less complex, land vehicle drivers have the same problem. In complex scenarios or at high speeds the HDD is not sufficient for safe operation.

To address this problem, audio systems have been used to direct the pilot of certain flight procedures. Among the most applicable is the use of audio systems by the ground crew to direct the pilot where the ground is during landing. However, for other flight operations, audio systems take too long to communicate vital data in time for the pilot to effectively respond. In order to communicate the data faster, a visual medium was needed. This was accomplished without solely relying on the HDD as well.

c. HMD and HUD

Both the HMD and the HUD provide a pilot the ability to visually interpret flight data from a large number of sources by providing in the pilot's field of view a display of information essential to control various systems. U.S. Pat. No. 4,961,626, Direct Incorporation of Night Vision in a HMD, describes a highly advanced helmet mounted display, HUD systems consist of a transparent screen that is presented between a human's field of view and the visual scene. On the screen are projected images that superimpose or project into infinity the computer generated visual image or other data. The screen is mounted in such a way that the human operator does not need to move his head down and refocus his eyes in order to receive information but needs to keep his head up for full visual input (hence a Head-Up Display) as well as data projected into infinity on the transparent screen. In FIG. 7, photo 20 shows a HUD not in use in the upper left hand corner. Photo 21 shows what looking through a HUD looks like while in use. The white lines and numbers provide flight data to the pilot directly in front of the pilot's field of view. Photo 22 shows a pilot looking through a different HUD. Diagram 23 and photo 24 show HUD technology used in car applications. Photo 24 shows how miles per hour and other driving data can be presented in HUD form for automobile drivers, effectively creating a safer method of driving. HMD systems however contain the visual screen directly in front of the eye by means of an attachment to the pilot's helmet. This optic component is transparent and called a combiner. The information usually displayed on the combiner pertain to piloting and weapons targeting and is projected and focused outward at infinity. This data is fed by the on board computer to a CRT image source. The CRT image is then projected through a series of optical components located in front of the pilot's eyes. Viewing through the combiner, the pilot sees a virtual image of the CRT image projected in his view of the exterior real world scene.

A HUD operates similarly except that the projected image is presented on a fixed transparent display mounted in the pilot's field of view. Many HMD systems exist today, among them include but are not limited to the list of HMDs presented in the following table 2:

TABLE 2

HMD

| Company name | HMD name |
| --- | --- |
| CAE Electronics | Fiber-Optic HMD |
| Fakespace | FS2. PUSH |
| FORTE Technologies | VFX1 HEADGEAR |
| General Reality | CyberEye CE-200N, CyberEye CE-200W |
| Hughes Training | CIV |
| Kaiser Electro-Optics | 1000 HRpv VIM, Color SIM EYE 60. Full Immersion HMD, Prsnl Ast. Hdst |
| Kopin Innovision | Vu-Port Monocular HMD |
| Liguid Image | MRG2, MRG3C, MRG4 |
| n-Vision | Full Color Datavisor, Datavisor 80. VR-Binocular |
| OIP NV Delft Instruments | HOPROS (CRT version) |
| SEOS Displays | Binocular Colour HMD |
| Shimadzu Corporation | STV-E |
| Virtual i-O | i-glasses! (PC & video) |
| Virtual Reality | High-Res. Color HMD 133 |
| Virtual Research Systems | VR4, VR4000, FS5 |
| Virtuality | Visette Pro |
| Visionics Corporation | Low Vision Enhancement System |
| Vista Controls, Inc. | See-thru-Armor. Vista Vision |

In order for the HMD to be in sync with the correct three dimensional position of the real world it was superimposing, tracking systems needed to be connected to an image generator system host computer. In order to create these visual images, a special type of computer called an image generator is needed.

d. Other Visual Immersion Methods

Any number of projectors can create an scenic area where one is immersed in graphics imagery where the walls become the visual virtual environment. This is described by Ben Delaney in *Virtual Reality gets the job* in the August 1994 publication of New Media on page 42.

e. Image Generator Systems (IGS)

The IGS is any computer hardware/firmware integrated circuit assembly graphic board and software capable of producing real time images of a three dimensional database.

A three dimensional perspective view of the warehouse is computed from a viewpoint which include roll, pitch, yaw information in relation to an x, y, z, coordinate location in real time. When any viewpoint or location changes an entire new image must be calculated. The time it takes to create and show this new image is the time calculated or the update rate. Real time is defined within this patent as any graphics three dimensional perspective output update rate above one Hertz (HZ). For this patent, real time can be further be defined into three sub-definitions. Near real time is defined as any graphics update rate between 1 HZ and up to 12 HZ, Almost real time is defined as any graphics output update rate between 12 HZ and up to 60 HZ, Optimum real time is defined as any output update rate above 60 HZ. The faster the image is requested to be updated, then the less amount of data that can be processed. The more visual information that is allowed in the database, then the slower the update rate and the less the imagery will appear to be in real time. The user will define which speed is the most favorable. To have a completely flicker free image, 60 HZ is necessary.

In addition to aiding pilots during flight and other operators in the piloting of their vehicles, these computers have been used in simulators to provide the visual part of the simulation. In FIG. 7, screen shot 25 shows how real time graphics technology has been used for train automobile drivers. The white lines are the sides of a road that are accessible in real time. There exist many IGS including but not limited to the following:

TABLE 3

IGS

| Company name | IGS name(s) |
|---|---|
| Evans and Sutherland Liberty and ESIG-4500. | Picture System II |
| Singer Link | DIG |
| Silicon Graphics | Reality Engine II |
| Lockheed Martin | CompuScene SE 1000/2000/PLUS |
| Compuscene VI | Compuscene PT 3000/4000 and REAL3D Pro-1000 |
| AAI Visual Systems | G1000/CMX AND G2000/ETX |
| CAE Electronics | Maxvue |
| Division | Provision 10 VPX |
| FlightSafety International | Vital VIII |
| Fujitsu | Open System ACG600/AG1600 |
| Hitachi | Hivis |
| IVEX Corporation | VDS-2000 |
| Loral | Advanced Distributed Simulation GT200 |
| Primary Image | P10 |
| Sogitec Apogee | |
| Tellurian | Eagle |
| Thomson Training and Simulation | SPACE Classic |
| XTAR Electronics | SuperFalcon 6000 and SuperFalcon 7000. |

In training usage, the IGS has been connected to an interface to a host simulator which is m turn connected to the host simulator system. The simulator system comprised of a mock cockpit, mock driver's seat, or the controls of any real aircraft, tanks, automobile or other vehicles that could be controlled in a simulated environment. Often the simulator had motion systems that would simulate the effect of small g forces on the pilot's body. The databases used by the IGS have historically been of large landscapes of the earth on which operators could train using their various machines. These databases were either created painstakingly by hand or with the aid of any Graphical User Interface (GUI) database generating building tools. These tools include three dimensional creating tool software systems and computer aided design/computer aided manufacturing (CAD/CAM) systems included but not limited to in the following table:

TABLE 4

GUI Database Generating Building Tools

| Company Name | Product Name |
|---|---|
| Multigen Inc. | Creator, GameGen |
| Paradigm | Vega |
| Sense 8 | WorldToolKit |
| MicroSoft | SoftImage |
| Macromedia | Extreme 3d |
| Caligari | TrueSpace 2 |
| NewTek | Lightwave 3d |
| Kinetix | 3d Studio MAX |
| Fractal Design | RayDream Studio |
| Byte by Byte | Soft F/X |
| | Visual Reality |

The simulator would simulate all of the components of a real aircraft or vehicle in order to make the simulator more realistic, HMD HUD, and HDD with their appropriate visual components are all used in simulation. The pilots joystick or the drivers wheel aids the operator in moving throughout the virtual world.

DISCLOSURE OF THE INVENTION

This VR WMS complement will allow for the first time in the history of warehousing the ability to visually keep track of all SKUs and have knowledge of their location and all other locations in the warehouse in real or non real time without the need to refer to symbols, logs or lists of such data.

Millions of dollars in warehouse construction costs are eliminated because available space to put stock can be found quickly and easily. Time spent finding stock is reduced and the difficulty level previously necessary is eliminated, allowing for larger quantities of goods to be processed as needed by consumers.

The introduction of virtual reality, real time and non real time graphics technology in warehousing management systems (WMS) allows for many advances. These VR components briefly include, image generator systems. Helmet Mounted Display (HMD) systems to be used in conjunction with image generator systems.

Never before has anyone applied this real time graphics technology to the specific field of logistics and challenges of managing and controlling inventory by visually locating stock within the warehousing and distribution industry. The warehousing industry is part of a greater logistics and supply chain industry which is in great need of this virtual reality warehouse management system complement (VR WMS complement) and its associated elements to locate physical spaces within the warehouse, and to perform with greater efficiency.

A. Warehouse Manager(s) Without a Computerized WMS

Figure 3:
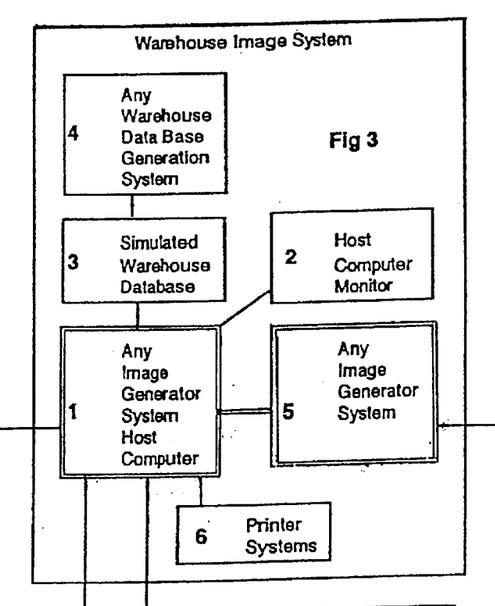

With this VR WMS complement, warehouse managers will no longer need to rely on their own memory abilities and non-computerized stock location systems to keep track of SKU locations and the available space to place them. This VR WMS complement will keep visual real time records of the high volume of stock processed in modern warehouses. Two dimensional maps will become obsolete as the three dimensional world of the warehouse will now be accessible in all capacities. Excessive amounts of paperwork that were given to workers are now eliminated as all communication of warehouse information can be done through an IGS human interface (FIG. 3).

B. Computerized Warehouse Management Systems (WMS)

WMS software with a naming method based on a stock location system will now have the addition of this VR WMS complement. The numbers and letters that describe the location of stock or an available space to place stock will now be deciphered by the VR WMS complement for easy and quick communication to a worker instead of having a worker do the entire interpretation based on the results of the computerized WMS.

Tediousness and inaccuracy in large volume and or complex warehousing is eliminated. This naming method based on a stock location system of the WMS combined with the VR WMS complement allows for warehouse locations to be found with ease, simplicity, rapid and accurate use. The SKU names of the stock location system can be superimposed on the visual image of that SKU. Therefore the naming conventions of the stock location system of the existing computerized WMS can be used simultaneously with this VR WMS complement. The picture images of stock can have the SKU number/letter placed on top of it. The invention can also be arranged so that the SKU number/letter will move in real time or non real time with the rest of the visual scene.

The naming conventions used in these WMS combined with the VR WMS complement will allow for new warehousing methods yet to be discovered. Users of a WMS combined with this VR WMS complement will be able to use all of the capabilities of the WMS alone to its fullest capabilities. A creator of a WMS combined with this VR WMS complement will be able to create new capabilities for the WMS that would never have been imagined. The WMS performance can be verified and corrected. Thus the actual WMS can be improved with this VR WMS complement as well.

C. Audio WMS Complements

Audio WMS complements interpret the written stock location system into audio that can be individually heard through headphones on or off a forklift or anywhere on the warehouse floor. These systems will no longer have the burden of supplying the entire data of location but will supplement the VR WMS complement which will have the majority of this task. Instead of relying 100% on audio, updated real time visual information allows a large increase in information transfer, allowing for fast warehousing. The scene that the warehouseman is currently viewing will always be described in full visual detail with the visual image changing as the warehouseman moves his head. Since this image has the option of being in real time, the rapid information is provided to perform daily warehousing tasks.

D. Automatic WMS Complements

Automatic warehousing attempts to eliminate human functions on the floor of the warehouse. It attempts to eliminate all human errors and problems of human labor. However, with this VR WMS complement problems of human labor will be eliminated with the capability of scheduling workers effectively and by making their task easier. These systems include but are not limited to, Automatic Guided Vehicle Systems (AGVS) and Automatic Storage and Retrieval Systems (AS/RS). The AGVS is intended to effectively replace the material handling vehicle operator by automatically selecting specified stock. Some AGVS use optical systems to follow painted lines on the warehouse floor. AS/RS are incorporated into the shelving structure so that stock can be selected without a human traveling within aisles. When situations occur that require human judgement these automatic and robot like systems cause errors and inefficiencies to occur. Only humans with this VR WMS complement can make the proper judgements with reliability, resolution, flexibility and safety. Humans will be augmented with this technology instead of technology completely replacing a human. This invention is a cheaper more cost effective method over the price/performance ratio of a fully automated system. Fully automated systems are expensive to purchase and expensive to maintain. By retaining the human element and incorporating visual target requisition with VR technology a more improved overall technology is created. It remains difficult to replace the human brain in this industry.

E. Real Time Warehouse Simulations

Warehouses have been visualized in three dimensions in a static non real time form providing an animated visual scene to promote conceptual thought on the design of a warehouse. Non real time is defined as any graphics update rate below 1 HZ. The present invention provides instant three dimensional perspective visual comprehension based on the instant three dimensional viewpoint needs of the user. Real time imagery is much faster than non real time images. For example, one frame from the movie. Toy Story can take up to 5 hours to generate. There are one million $\frac{1}{60}^{th}$ of a second units in 5 hours. Real time must be one million times faster than this type of animation. In real time one has the capability to choose what to see within the presented visual. In the present invention, images are capable of being instantaneously correlated with real warehouse events and truly be effective. Stock items can be individually selected from the mass of the warehouse and coordinate with the real events. The VR WMS complement assists in all aspects of warehousing. It provides a large amount of information, allowing it to perform multiple other warehousing functions.

F. Additional Capability List

In addition to all the above warehouse management techniques warehouse operators with this VR WMS complement will have the capabilities of:

a. Locating outdated and obsolete inventory. Locating current inventory eliminates the need for surplus stock production and wasteful redundant expenses.

b. Identifying available space within the warehouse and avoiding new warehouse construction. Space within partially empty bins can be visualized with various imaging techniques and all possible perspective views. Wire frame, translucent, transparent imaging options allow for a user to quickly identify lost space. Identifying space with accuracy according to precise three-dimensional information as well as other parameters such as accessibility can now be done. Packing methods that optimally conserve available space are performed with the aid of these imaging techniques.

c. Easily and quickly tracking stock movements allowing for fast delivery and an accurate system of handling customer returns, also called reverse logistics. Within reverse logistics, the precise location of defective items caused by manufacturing defects, sabotage and other reasons. Will now be easily and quickly found.

d. Having the instant knowledge of the location of stock and its available space on a global basis.

e. Training workers who only know one language in a short amount of time. The visual nature makes understanding and operation self-explanatory in all cultures and languages. The time taken to read a stock location system manual and fully understand it is eliminated.

f. Control over manipulation of stock is easy with full imagery of all possible warehouse viewpoints.

g. Informing various managers across the logistics infrastructure and departments of an organization of the instant and updated knowledge of location of stock and available space for it in multiple warehouses in order to make general suggestions, plan future events and quickly respond to changes in a volatile market.

h. Providing workers the quick and accurate visual real time information to pick orders and place stock. Visual imaging techniques can provide a yellow brick road in the most efficient route to the location of stock in order to fill a specific order. Providing workers visual information that will prevent them from getting lost in the warehouse and find stock quickly by reducing travel time. Material handling vehicle operators are prevented from creating traffic jams. Once at the general location real time visualization allows them to quickly select stock. These techniques include the use of superimposed color coding, wire frame and translucent images i. Delegating tasks efficiently to workers are possible by continually observing representations of workers and their interactions with stock through visualizations. Manpower and material handling vehicle usage time and the amount of shifts necessary can easily be projected according to the projected future flow of the warehouse.

j. Providing forklift and other material handling operators the ability to freely use their hands to safely operate their vehicles and locate stock at the same time. With the aid of various IG human interface systems, including the use of the HMD and/or HUD, operators can simply look directly at stock and see the needed information in a transparent image projected onto the HMD visor or HUD shield.

k. Providing time to simply visually inspect the warehouse at often intervals to insure that proper protocols are met such as storage of items in certain places within given parameters. These parameters include hazardous materials and food stores, similarly requested items, security of materials, etc. The time taken to visually inspect the warehouse to ensure that SKUs are in the proper place can now be done from a central location or numerous other locations. For example, inspectors can ride a forklift fitted with this VR WMS complement or a component of it and perform inventory checking to detect 'differences'. Differences is a term used in warehousing to describe stock that should be there when in reality it is not. The warehouse can be color coded to identify specific types, sections, and categories of stock within the warehouse.

l. Many planning and design functions can be provided using both real time and non real time capabilities. Viewing a warehouse database can be performed with an animation (non real time) and with real time, the database can be experienced with the freedom to move about anywhere in the warehouse, from any viewpoint in three dimensional space, at any time to see the visual information immediately. All information of the warehouse can be accessed visually and immediately.

m Optimizing the use of trucking loads. Often trucks run empty due to non coordination of industry—when they could run full.

n. Superior coordination and communication between inter company units and between business to business organizations.

o. Superior understanding at all levels of the supply chain by everyone involved.

p. Verification of the WMS.

q. Planning and design of the most optimum warehouse design according to potential scenarios.

With the real time capability, planning and design of a warehouse can be done quickly with the input of many people. Suggestions and comments with an immediate visual result of them can be possible in one meeting. Large amounts of warehouse information can be processed and displayed quickly.

Supervising a warehouse's operations can be performed by moving through a warehouse database that is a model of the real warehouse. Warehouse operations can be simulated in action. Within the real time capability, specific SKUs, stock movements, changes in the warehouse, and any other potentially visual information are all updated to the second or at 60 HZ or at any other rate and provide an opportunity for warehousemen to suggest immediate resolutions to immediate situations and visualize their own results. In a non real time mode, an animation of the warehouse can be made in greater detail in order to observe more specific visual data in the warehouse. This is due to the extra time that the computer has to draw a more complex scene. However, in the real time mode, warehousemen have the opportunity to move about within the model warehouse database however they desire. They are not restricted to movement within any one pre-chosen pathway but have that option as well. An operator can have a bird's eye view or even the view that a mouse would have of the warehouse.

The operator can visualize only one category of stock at a time and visually erase all other stock in order to manage one type of item at one time. This will eliminate the confusion that can be created of all stock movements within one warehouse.

In the real time mode, simulations of potential scenarios of everyday warehousing can be done immediately, preventing hazards and saving potentially wasteful warehousing operations. Warehouse operators can simulate their recommendations before implementation and observe effectiveness. Common simulations are: the determination of appropriate shelving systems, the operation of new material handling equipment, the operation of innovative warehouse designs—all operations that can now for the first time in warehousing be seriously considered for purchase due to the ability to examine all simulated results, without purchase, and the return on an investment that they would bring. Other simulations include projecting how the warehouse will function when a large order is delivered or projecting any other type of scenario in order to properly prepare for the future. A simulation of a future day's activities within a short amount of time can provide warehouse managers knowledge of what needs to be done to affectively accomodate the day.

If more time permits, the non real time capability would allow greater visual detail of the warehouse with an animation.

By observing the affects of a new warehouse design in both real time and non real time, potentially monumental savings in time and increases in stock volume processed can now be achieved. The simulation of complex warehousing techniques is now possible as there are numerous quantities of stock transfers that can be visualized and various viewpoints that can now be used to comprehend various warehouse operations. With the new full visual understanding provided, the configuration of dock bays can be designed with full optimization, as this VR WMS complement can display the large amount of inventory that moves in a dock bay. Another complex warehousing technique capability that eliminates the need to store SKUs by transferring stock directly from one docked transport to another is called crossdocking. The amount of visual information in crossdocking is processed fast enough to be effective in everyday warehousing.

Organization leaders can simply view any warehouse in the world and view any part of that warehouse from one central location. Even remote warehouses can easily be reviewed. The entire world can be viewed showing all warehouse locations and stock locations en route in shipping vehicles. The desired warehouse or vehicle can then be viewed by zooming the eye point to that location. This invention is not limited to conventional warehouse buildings but can be applied to all types of warehouses. Such examples are shipping vehicles with many items on board where transport time often is long. During this time, the unloading of stock from docks can be affectively planned. Another unconventional warehouse example is a library where books can be found much faster with the same methods described above.

DESCRIPTION OF THE INVENTION

With the visualization capabilities of the invention, multiple warehousing capabilities can be performed in ways never before imagined. This invention provides warehousing managers with real time and non-real time three dimensional SKU location information to use and augment all facets of the warehousing process. With real time SKU data, as opposed to non real time data, SKUs can be located faster and easier as a warehouse manager can move within the computer generated warehouse with an update rate of images that occur from 1 (one) HZ to 60HZ and faster. In non-real time a warehouse manager cannot move through the warehouse database at his own free will, but must either wait for the image to update, a slow process for the quick necessity of warehousing, or walk through an animation of the warehouse that has been prearranged and not useful for the dynamic needs of all warehousing processes but can be used for future planning requirements. Non real time is any graphics output rate below 1 (one) HZ.

Figure 1:
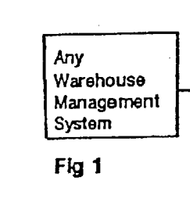
FIG. 1 represents a warehouse management system (WMS) capable of identifying locations of the warehouse according to a stock location naming system.

FIG. 1 WMS

A brief list is provided in table 1. This includes any warehouse management system (WMS) software which uses a stock location system of naming SKUs. These systems usually use graphical user interfaces (GUI) in the form of windows that allow a warehouse manager to perform daily warehousing tasks by using knowledge of the location of SKU within a warehouse and within other stock items.

Figure 2:
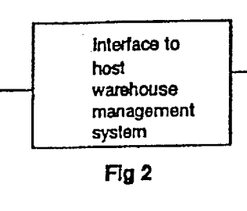
FIG. 2 represents the interface to the host WMS.

FIG. 2 Interface to the Host WMS

Figure 6:
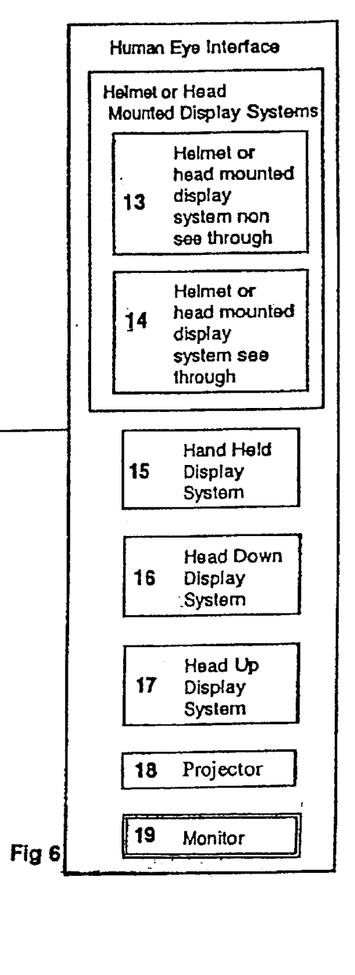

The interface to the host WMS (FIG. 2), consists of customized software along with hardware connections catering to a specific WMS stock location system that correlates, integrates, and translates the exact coordinates of the simulated warehouse database 3 on the IGS 5 with the coordinates used on the stock location system of any WMS (FIG. 1), so that as the conventional, stock location system of the WMS is used the correlating image of the SKU can be simultaneously viewed on any type of IGS human eye interface (FIG. 6). A map from the WMS stock location system has to be converted to a three dimensional data base. This interface to the host WMS parses data from the WMS to the formats of the database and the specific IGS chosen. A specific interface must be developed for each combination of IGS and WMS data formats. An interface control document will need to be created to accomplish the software necessary to handle these conversions. Hardware interfaces can range from connecting thru the internet, loppy disks. RS-232 interface or any other means by which data can be transferred from the WMS (FIG. 1) to the warehouse image system of FIG. 3.

FIG. 3 Warehouse Image System (WIS)

This provides the user with a real time three dimensional visual representation of the warehouse. Three dimensional SKU data is created in real time and optional non real time by first constructing a simulated warehouse database 3 in the IGS 5 through the IGS host computer 1. The simulated warehouse database 3 is created with any warehouse database generation system 4. The IGS 5 is connected to the IGS Host computer 1 via a standard PC connector. Connected to the IGS host computer 1 is any printer system 6.

Numeral 1 WIS: IGS Host Computer

This consists of any computer system or any computer system capable of interfacing with any IGS 5.

Numeral 2 WIS: IGS Host Computer Monitor

This consists of any monitor that can be connected to the IGS host computer 1.

Numeral 3 WIS: Simulated Warehouse Database

This represents the warehouse database that graphically represents the real physical structure of any warehouse and can show such details of a warehouse from a simple graphical cubical three dimensional representation to such an extent that such items as aisles. SKUs, shelves, pallet racks, forklifts, and unused portions can be graphically represented in three dimensional detail necessary to perform complex warehousing functions where it is inputted into the IGS 5. The physical coordinates used to create the simulated warehouse database are inputed using points, polygons, texture maps (including photographic), vectors or any other standard geometric and trigonometric mathematics. Standard geometry and trigonometric calculations shall be as defined in the textbook "Computer Graphics Principles and Practice. Second Edition" James D. Foley, Andries van Dam, Steven K. Feiner, and John F. Hughes, Addison-Wesley Publishing Company, ISBN 0-201-12110-7, and all references that this book calls out. The three dimensional data base is designed to look like the real world within the constraints of the real time IGS 5.

Numeral 4 WIS: Warehouse Database Generation System

These consist of graphical user interfaces made for the purpose of creating visual databases. These include three dimensional creating tool software systems as listed but not limited to table 4.

Numeral 5 WIS: Image Generator System (IGS)

Listed in table 3, this consists of any hardware and software combination capable of creating real time or optional non real time warehousing imagery and other logistics scenes.

Numeral 6 WIS: Printer Systems

These consist of any device capable of providing a visual image on any medium such as paper, slides, viewgraphs, transparencies, etc. These devices include plotters.

Figure 4:
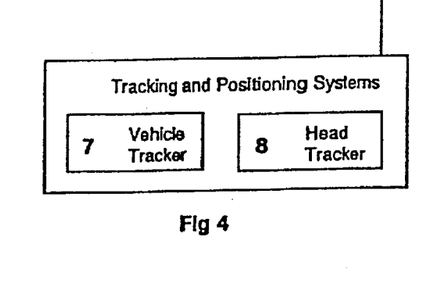

FIG. 4: Tracking and Positioning Systems

Tracking and positioning systems 7 and 8 connected to the IGS host computer 1 keeps track of the location of the HMD within the warehouse. These systems correlate to the IGS Host computer the three dimensional eye point location of a user between the real physical warehouse and the virtual warehouse database. The tracking and positioning system communicates to the IGS the movements of the HMD mounted on the human head. Wherever the warehouse worker moves the warehouse image system will keep up the correct imagery to properly superimpose the real world. The HMD is in synchronization with the driver of the forklift and the forklift is in synchronization with the position of the warehouse.

Figure 5:
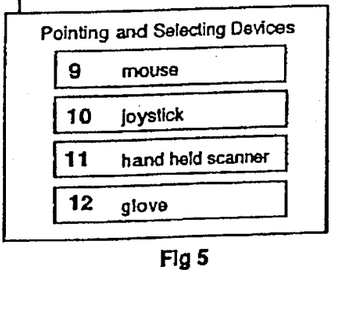

FIG. 5 Pointing and Selecting Devices

These include any devices that help the human move through the virtual world. These devices include but are not limited to the following: mouse 9, joystick 10, hand held scanner 11 and glove system 12. The glove system can be used to select, pick up, move, etc. that would otherwise be difficult with other devices.

FIG. 6 Human Eye Interface (HEI)

This consists of any device where the information of the IGS and its warehouse database is communicated to the human eye. The Warehouse Image System (FIG. 3) is connected to any number(s) of human eye interfaces (FIG. 6) via any means to transmit an image to the device such as a video cable, tv signal, radio frequency, etc. The human eye interface (FIG. 6) consists of any device capable of transmitting or communicating the warehouse image system information to the human eye. With these human eye interfaces, the user can see the location of inventory that is targeted for selection in much the same way enemy targets are selected in the military as on the F-15E, F-16, AH-64 and other aircraft. A forklift operator can see the pathway to select inventory in a similar method that a pilot's HUD can visualize a pathway in the sky for flying. Instead of an exterior world of land, clouds and runways of the pilot, the exterior world (on which an image is superimposed upon) seen by a warehouse operator is the warehouse, its stock and all other components of the entire supply chain including trucks, trains, ships, planes, etc. The most common of these include a helmet mounted display (HMD), either non see through 13, or see through 14, a hand held display (HHD) 15, a head down display (HDD) 16, a head up display (HUD) 17, projection system 18, a monitor 19, or any other device that inputs the warehouse image system into the human brain via the human eye.

Numerals 13,14 HEI: Helmet Mounted Display (HMD)

A list of these are provided in table 2. Similar to the HUD but with an optic lens mounted on the helmet and positioned over the eye, the HMD projects imagery onto a see through visor. A human can see the projected translucent to transparent image of visual information of the warehouse database on the clear visor as well as the view beyond the visor. This see through visualization function allows for the projected visual imagery on the visor to superimpose objects that are seen beyond the HMD.

Numeral 15 HEI: Hand Held Displays (HHD)

HHDs 15 have small monitors that can be carried by hand and display visual information of the warehouse database from the IGS 5 to warehouse workers. As a warehouse worker moves within inventory, the HHD 15 will provide the visual information of the warehouse image system (FIG. 3).

With this VR WMS complement the HDD 16 will be used to aid material handling drivers in selecting inventory as they pause from observing their field of view and read the HDD 16 for visual location information Numeral 16 Head Down Display (HDD)

The HDD 16 consists of any type of display, preferably a flat panel display that takes up a small amount of space, that can be located in the peripheral field of view of an material handling vehicle. Although the images are not superimposed, the visual image created in three dimensions by the image generator is similar to the corresponding real world view.

Numeral 17 HEI: Head Up Displays (HUD)

A Head Up Display (HUD) 17 is used to display the visual warehouse image system onto the display glass which is mounted in the field of view of operation of any material handling vehicle. The Warehouse Image System (FIG. 3) image is correlated and superimposed over the real world scene.

Numeral 18 HEI: Projection Systems

The visual warehouse database information is presented onto walls, domes, screens, etc. that would immerse the user in a virtual scene. Projector(s) display the corresponding imagery via various means such as lenses, beam splitters or any other means onto any number of surfaces.

Numeral 19 HEI: Monitors

The visual warehouse database information is presented on the screen where a human can look at and obtain visual information on a monitor. Computer monitors create a virtual image that is not superimposed on the warehouse. The image represents the warehouse.

BRIEF DESCRIPTION OF DRAWINGS

FIG. 3 is a representation of a Warehouse Image System. It consists of:

numeral 1: any image generator system host computer numeral 2: image generator system host monitor numeral 3: a simulated warehouse database numeral 4: any warehouse database generation system (an optional component to the VR WMS complement), numeral 5: any image generator system (IGS), numeral 6: any printer system that creates a hard copy of the visual data, FIG. 4 represents optional tracking and positioning systems consisting of:

numeral 7: vehicle tracker numeral 8: head tracker

FIG. 5 represents pointing and selecting devices which consist of but are not limited to:

numeral 9: mouse numeral 10: joystick numeral 11: hand held scanner numeral 12: glove FIG. 6 represents any human eye interface which are not limited to the most common which are:

numeral 13: a non see through helmet mounted display (HMD)

numeral 14: a see through HMD numeral 15: a hand held display numeral 16: a head down display (HDD)

numeral 17: a head up display (HUD)

numeral 18: a projection system numeral 19: a monitor

MODES FOR CARRYING OUT THE INVENTION

The Base System of the Invention: $1^{st}$ System Combination

The IGS host computer 1, any image generator system 5 (non real time and/or real time) and a monitor 19 can achieve spectacular advances in the field of warehousing. These components comprise the base system of the VR WMS complement.

$1^{st}$ System Combination With a Simulated Warehouse Database 3

Figure 10:
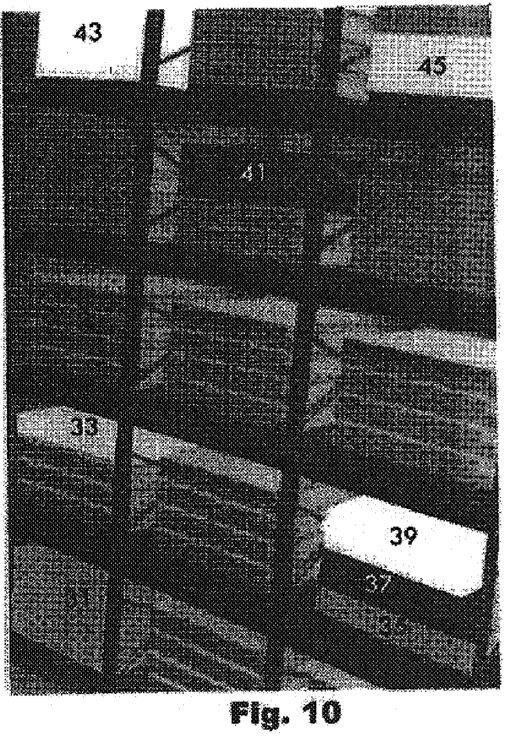
FIG. 10 is a graphical computer representation corresponding to the view of FIG. 9.
Figure 12:
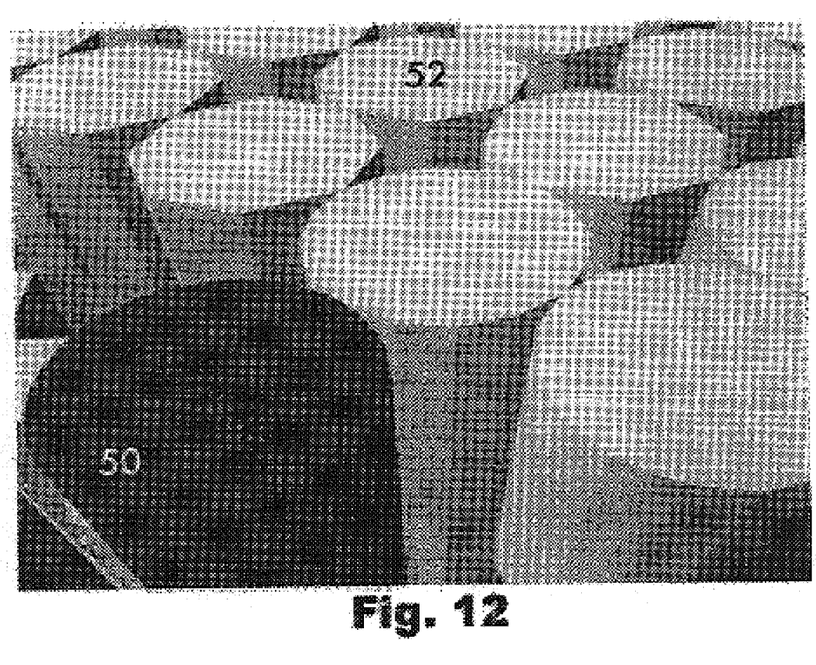
FIG. 12 is a graphical computer representation corresponding to the view of FIG.

This consists of all the abilities and components of the base plus the creation of the virtual, computer generated world. The simulated warehouse database 3 can be created with any warehouse database generation system 4. The abilities to the $1^{st}$ System Combination with a Simulated Warehouse Database 3 include:

Viewing a warehouse database can be done in both non real time and real time. Real time meaning that the database can be experienced with the freedom to move about anywhere in the warehouse, at any tune to see the visual information immediately. Any data can be accessed in this visual method immediately. FIG. 10 is one such image that can be created. The numerals on the FIG. 10 are color coded to show stock that needs to be moved according to current needs. FIG. 12 is another such image zoomed in for detailed viewing.

Warehouse operations can be simulated in action. Specific stock movement planning, and any other potentially visual information are all updated to the second at 60 HZ or at any other rate to provide an opportunity for planners to suggest resolutions to immediate situations and visualize their own results. Non real time can be used for an animation of an extremely detailed warehouse in order to observe more specific visual data. However, in real time, one's eyepoint can be moved with the freedom to move anywhere within the model warehouse database. Movement is not restricted within any one pre-chosen pathway. One can view the IGS image from any viewpoint and location in three dimensional space.

The operator can visualize only one category of stock at a time and visually erase all other stock in order to manage planning of one type of item at one time; eliminating the confusion that can be created when all stock movements of one warehouse are displayed simultaneously. In addition many windows into the three dimensional world can provide various views simultaneously.

In the real time mode, simulations of potential scenarios of everyday warehousing can be done immediately, saving potential hazards from occurring and saving potentially wasteful warehousing operations. Warehouse operators can simulate their recommendations before implementation and observe effectiveness.

Simulations include: the determination of appropriate shelving systems, the operation of new material handling equipment the operation of innovative warehouse designs—all operations that can now for the first time in warehousing be seriously considered for purchase due to the ability to examine all simulated results, without purchase, and the return on an investment that they would bring.

Other simulations include projecting operations when a large order is delivered or projecting any other type of scenario in order to properly prepare for the future. A simulation of a fixture day's activities in a short amount of time can provide warehouse managers knowledge of how to affectively accomodate the day. If more time permits, the non real time capability allows for greater visual detail of the warehouse.

Ease of Communications

Various managers can easily be informed across the logistics infrastructure and even to broader departments the possibilities of potential warehouse designs and future material flows in what if scenarios in order to make general suggestions, and plan future events such as quickly responding to changes in a volatile market. A company's departments can be unified by communicating current operations to finance, sales, marketing, manufacturing and purchasing departments.

Planning and design of a warehouse can be done quickly with the input of many people. Suggestions and comments with corresponding immediate visual results can be possible in one meeting. Large amounts of warehouse data can be processed and displayed quickly.

Concepts can be communicated to various global business units without worrying about translation problems. The visual nature makes understanding of a manager's warehousing concepts self explanatory in all cultures and languages. The time taken to successfully interpret ideas to the languages spoken in multiple global business units is avoided. Future warehousing operations are not limited to a single language due to the difficulties of translation. New markets around the globe can now easily be planned. Warehouses can be strategically built in the right market location without pressure to build new inefficient warehouses in one part of the world due to an idea stopping language.

Planning and Design

The storage of items can be planned in specific places within given parameters. The flow and placement of hazardous materials and food stores, similarly requested items, security of materials, etc. can be planned. The future warehouse can be walked through as it operates. The simulation can be sped up or slowed down in order to gain a better perspective to optimize even component of a future warehouse. Color codes can be used to distinguish specific types, sections, and categories of stock as they are moved.

Costly new warehouse construction and/or expansion and future maintenance expenses are avoided. Construction is planned for only what is absolutely necessary. Space within partially empty bins can be visualized with the VR WMS complement's capability of various imaging techniques and all possible perspective views. A designer can visualize where materials have been placed Precise three-dimensional data allow for accessible planning of forklifts and people. Areas can be designed with sufficient space for repacking. The possibilities and shortcomings of automatic warehousing can be planned for. Errors of AGVS and AS/RS can be predicted and/or shown. Warehousing motions can be observed as they have been setup. It can be determined whether automatic systems are profitable or dangerous to a company's warehousing operation.

Personnel Planning

Workers' schedules with graphical representations can be planned. Future events can be brainstormed and played out in any viewpoint and in any amount of detail. As experimental warehousing methods are observed, some ideas will be noted to be impractical. As one aspect of any plan is modified changes can be observed in the way they affect the entire supply chain. Material handling operators are prevented from creating traffic jams. Tasks to workers are planned and the efficiency of methods tested by observing representations of workers and their interactions with stock. Manpower, vehicle usage time, and the number of shifts necessary can easily be projected according to the projected future flow of the warehouse.

Stock movements can be tracked in a simulation of what if scenarios and efficiency of such advanced warehousing techniques such as just-in-time (JIT) and reverse logistics can be observed. New warehousing techniques can be created and observed in order to create a higher level of efficiency. With easy visualization, customer service in fast delivery is achieved as are customer returns. Ideas of stock flows can be manipulated along with warehouse designs with full imagery of all possible warehouse viewpoints.

By observing the affects of a new warehouse design in both real time and non real time, monumental savings in time and higher stock levels processed is achieved. Various viewpoints can be used to comprehend various warehouse operations. With the new fill visual understanding provided, dock bay configuration can be designed with full optimization, as large stock amounts can be visualized. Any complex warehousing technique can be visualized including crossdocking.

The VR WMS complement is not limited to conventional warehouse buildings but to all types of storage facilities. This VR WMS complement can be used in hi volume shipping vehicles. Oceanic transport time often is long. During this time, the unloading of stock from docks can be affectively planned en route.

$2^{nd}$ System Combination

Consists of the $1^{st}$ system combination which consists of the IGS host computer 1, any image generator system 5 (non real time and/or real time) and a monitor 19 plus the addition of Interface to host WMS FIG. 2 and Any WMS FIG. 1 where the Interface to Host WMS FIG. 2 integrates Any WMS FIG. 1 to the IGS Host 1.

Any WMS FIG. 1 data is transmitted to an Interface to host WMS of FIG. 2. This data is transferred via any known means including but not limited to direct cable connection rs-232, internet floppy disk, cd-rom, radio frequency, etc. The Interface to host WMS translates this data into a form that the IGS host computer 1 understands.

FIGS. 10 and 12 are images that can be presented in this system combination where color coded stock items are identified according to the WMS. Once accomplished, planning and design of warehouses can be done by predicting SKU flows by using the basic warehousing software functions of a conventionally independent WMS (FIG. 1) and visualizing the affects with assistance of the Warehouse Image System of FIG. 3 and the IGS human eye interface (FIG. 6). Receipt and placement of SKU can be done with the basic warehousing software functions of a conventionally independent WMS (FIG. 1) and visualizing them on the IGS human interface. For the first time, new methods of warehouse management will be introduced that could never have been done with previous WMS capabilities.

Still images of any perspective and any amount of detail can be produced as printouts or any other form. The IGS human interface will allow warehouse managers to develop new warehousing methods such as: visualy inspecting and perusing any warehouse and its elements in the world from one location. Visualization of all aspects of the warehousing process will affect vital management decisions and input choices made on the basic warehousing functions of the WMS.

The capacity for instant knowledge of the location of stock and available space with visual information is achieved. Space is found and stock is organized more efficiently to make more space with the visual 3-D abilities of the VR WMS complement. Various imaging techniques such as wire frame, translucent transparent imaging options and all possible perspective views can show space within partially empty bins.

Naming methods of the stock location system of the existing WMS software is used simultaneously with the VR WMS complement allowing for locations to be found easily, simply, rapidly and accurately. This naming method is deciphered for easy and quick communication instead of a worker performing the entire interpretation based on the results of a WMS working alone. The SKU number/letter can be placed on top of the picture images of stock so that it will move in real time or non real time with the rest of the visual scene.

Use of the WMS combined with the VR WMS complement allows the use of the WMS alone to its fullest potential functionality. WMS users will find more uses for the existing WMS. Existing WMS software can be verified and corrected, thus improving the existing WMS.

The dynamic versatility of the $3^{rd}$ System Combination allows it to be used for both administrators and pickers. An administrator's station is placed in any office allowing for comprehensive and vast oversight of any type of warehousing operation. The pickers and packers station eases stock location methods as well as packing techniques. When the station is placed on the warehouse floor, pickers can access it for guidance before venturing into aisles. Pickers can use one placed nearby to aid in space conserving packing methods. Image printouts of both stations allow for a hardcopy to be taken to the site to be used as a quick visual guide.

Administrator's Station

Time spent finding stock is reduced and the difficulty level previously necessary is reduced, allowing larger stock quantities to be processed as needed by consumers. Locating inventory eliminates surplus stock production and wasteful redundant expenses. Stock movements are easily tracked, allowing for fast delivery and an accurate system of handling reverse logistics. The precise location of defective items caused by manufacturing errors, sabotage and other reasons will be easily and quickly found.

Warehouse inspections can be done at often intervals, saving time to insure that proper protocols are met such as storage of items in specific places within given parameters including hazardous materials, food stores, similarly requested items, security of materials, etc. Differences are detected in inventory checking tours from a central location or any other location. Color codes identify specific types, sections, and categories of stock. Collective suggestion making such as planning future events in order to quickly respond to changes in a volatile market can be performed. Stock manipulation and control is easy with full imagery of all possible warehouse viewpoints. Organization leaders can simply view any warehouse in the world and view any part of that warehouse from one central location. Even remote warehouses can easily be reviewed. During long transport times, SKUs can easily be rearranged on board high quantity stock shipping vehicles with real time visualization in anticipation of the next drop off or loading.

Any SKU can be visually located in any part of the world from one central location and lost, misplaced and stolen stock is avoided as are remanufacturing duplicate orders. Manufacturing costs are saved.

This capability eliminates confusion when all stock movements of one warehouse are displayed simultaneously.

Pickers and Packers Station

Packing methods that optimally conserve space are performed with the aid of imaging techniques. The visual nature makes understanding and operation self explanatory and fast in all cultures and languages. The time taken to read a stock location system manual and fully understand it as with an independent WMS is eliminated. Workers will have the quick and accurate visual real time data to pick and place stock as they travel to and from the floor based pickers and packers station. Workers will be prevented from getting lost and will find stock quickly by reducing travel time. Once at the general location, printouts of visual imaging techniques allow pickers to quickly select stock. Tasks are delegated efficiently by continually observing representations of workers and their interactions with stock through visualizations. Manpower, vehicle usage time and the amount of shifts necessary can easily be administered according to current operating needs.

The visual, instant knowledge of where to place inventory as it comes in and is shifted is instantly known, saving labor hours and wages, decreasing operating capital needs.

By observing warehousing methods in live operation, monumental savings in time and increases in stock volume processed can be achieved. The shortcomings of techniques can be observed, new ones can be implemented and space found. Complex warehousing techniques are possible as there are numerous quantities of stock transfers that can be seen and various viewpoints that can be used to comprehend various warehouse operations. Packing methods in dock bays use see through space finding abilities. Crossdocking is another easily viewed complex space-saving warehousing technique. The amount of visual information in cross docking and in dock bays is processed fast enough to be effective in everyday warehousing.

$3^{rd}$ System Combination

This consists of all the abilities and components of the $2^{nd}$ system combination plus the addition of an HMD.

HMD Administrator's Station

In addition to the capabilities of the administrator's station, a manager will be able to look around and instead of seeing the confines of an office, he will see any section of the warehouse in operation. Using imaging techniques, he can see through storage units and pick out specific stock. While remaining in an office, a manager's sense of sight is immersed in the warehouse location by freeing his eyes from the limiting vision of a monitor. Thought is stimulated and decisions are made with more insight. Imagery such that of FIGS. 10 and 12 can be seen.

HMD Pickers and Packers Station

At a designated fixed location in the warehouse, color coded data allows warehouse scrutiny. One's vision of the warehouse, SKU, shelving, etc. is electronically augmented with live superimposed computer generated images. Wherever an individual chooses to turn his head expanded vision provides so much data so quickly and with full comprehension. This is the most effective and comprehensive way of communicating such a vast amount of data to the mind. The pickers and packers station without the HMD does not permit this speed. Looking around a warehouse with the unaided eye and looking around a live computer generated warehouse within the confines of a monitor are two separate functions that the human mind has difficulty integrating. The HMD achieves this. The HMD augments all of the capabilities of the $2^{nd}$ System Combination.

$4^{th}$ System Combination

This consists of all the abilities and components of $3^{rd}$ System Combination plus the addition of tracking and positioning systems of FIG. 4 to the HMD of FIG. 6. The abilities of the $4^{th}$ System Combination include:

HMD With Tracking

With the HMD functions of the $3^{rd}$ System Combination, the ability to move anywhere is added with the corresponding scene lining up with the superimposed computer generated image. Any part of the warehouse can be traveled to at will, while taking into account an operational warehouse with superimposed updated image information using any combination of selective visual methods.

Figure 8:
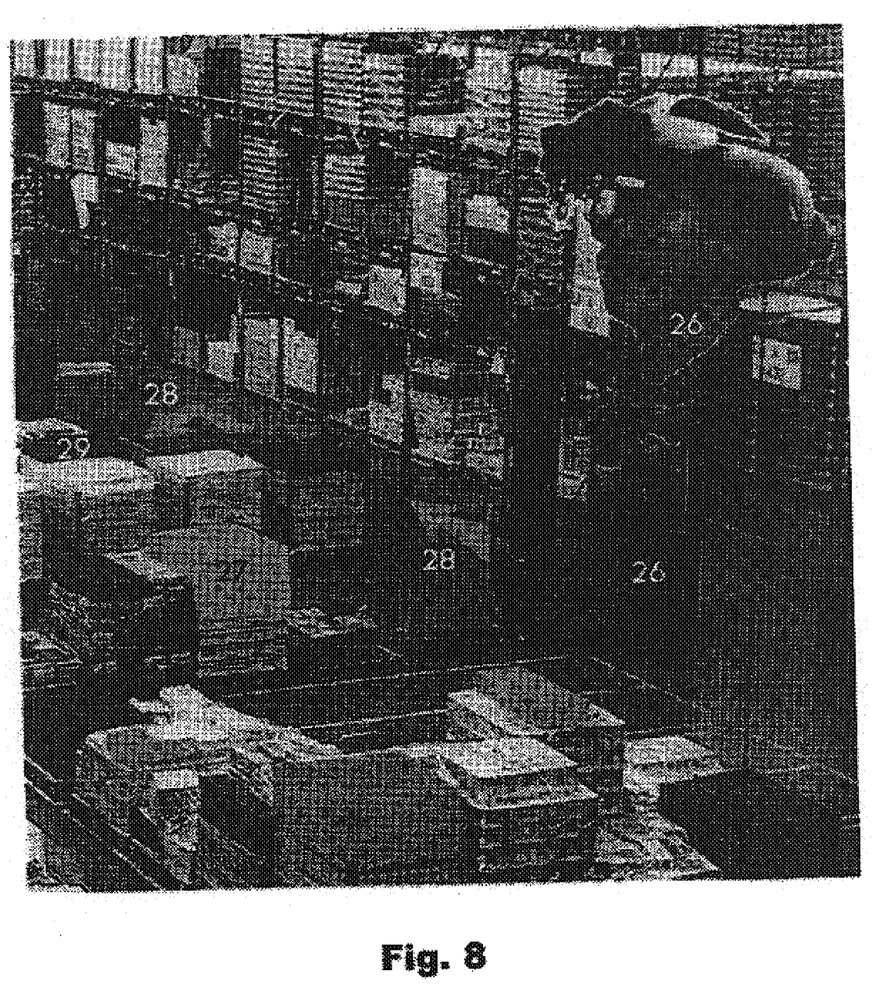
FIG. 8 shows an example of a head-mounted-display (HMD) in a warehouse application, as viewed by a warehouse operator.
Figure 9:
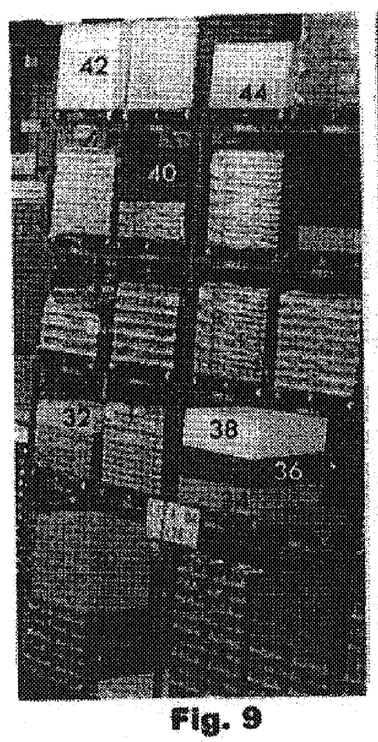
FIG. 9 is a detailed view of a portion of the warehouse operator's field-of-view as seen in FIG. 8, highlighting specific stock items.
Figure 11:
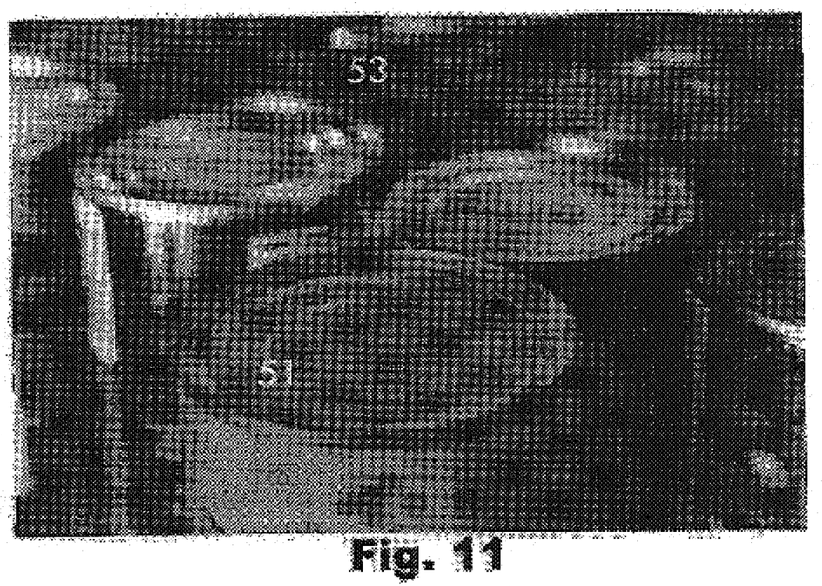
FIG. 11 is an individual item-level detailed field-of-view of a portion of the warehouse operator's field-of-view.

As seen in FIG. 8, forklift operator 26 is fitted with the HMD with Tracking system. As the operator looks around the warehouse, translucent colors identify stock that needs to be selected. Color coded stock item 27 is one such item. As one task is completed, superimposed arrows 28 show where the operator needs to go next and pick the next superimposed color coded stock item 29. The warehouse information would come from the WMS and transmitted to the mobile forklift via a radio frequency. FIG. 9 shows with more detail what the forklift operator would see with the HMD. Color coded translucent imagery is labeled with even numerals 30 through 44. FIG. 10 shows the exact same scene in FIG. 9 but as it would be seen with 100% computer representation. FIG. 10 can be easily viewed with a monitor or a non see through HMD. A manager can view FIG. 10 in a remote office, but see the exact same image FIG. 9 that an operator is viewing. The translucent color coded stock item corresponds with color coded item 31. Similarly, item 32 corresponds with item 33, item 34 corresponds with item 35, item 36 corresponds with item 37, item 38 corresponds with item 39, item 40 corresponds with item 41, item 42 corresponds with item 43, and item 44 corresponds with item 45. As more specific stock quantities are selected, shown in FIGS. 11 and 12, the same color coding and translucent methods apply. Can 51 is translucently color coded so the operator knows what to pick. Can 53 as all other cans are not color coded. The corresponding visual image can be seen as well. Computer generated can 50 corresponds with the real translucently color coded can 51. Computer generated can 52 as all other cans are not color coded as they do not need to be selected.

Workers have quick and accurate visual real time data to pick orders and place stock faster and without error. The arrows provide the most efficient route to the location of stock in order to fill specific orders. As they move via a forklift, they will simply follow the automatically created path and select the automatically designated, color coded stock. Workers have more visual data that will prevent them from getting lost and find stock quickly by reducing travel time. Once at the general picking location, visual imaging techniques allow them to quickly select stock. These techniques include superimposed color coding, wire frame and translucent imagery. Worker confusion is eliminated in the everyday functions of warehousing.

Forklift and other material handling operators can freely use their hands to safely operate vehicles and locate stock simultaneously. Operators simply look directly at stock and see the needed data in front of their eyes. The HMD with the Tracker ability introduces extra safety to workers and more efficient warehousing techniques. Two dimensional maps and printouts will become obsolete as the three dimensional world of the warehouse is accessible in all capacities. Excessive paperwork previously given to workers is eliminated as all communication of warehouse data can be done through the VR WMS complement.

Audio WMS no longer have the burden of supplying all location data but will supplement the VR WMS complement which will have the majority of this task. Instead of relying 100% on audio, updated real time visual data allows large increases in data transfer, allowing for fast warehousing. Science has proven that over 90% of data received by humans is introduced into the brain through the eyes. The scene currently in view by the user will always be described in full visual detail, with the visual image changing as the operator moves his head. Since this image has the option of being in real time, rapid data permits daily warehousing.

Automation attempts to eliminate human error and labor problems. Reliance on AGVS and AS/RS and its inherent shortcomings is no longer necessary. When situations require human judgement these automatic and robot like systems are the cause of error and inefficiency. This VR WMS complement allows workers to closely and easily interface with automated procedures and use human judgement that cannot so easily be replaced. The difficulties of human labor working alone will be eliminated with the capability of electronic eye scheduling The 4th System Combination combines the best of both worlds. Human judgement is combined with the powerful automating capabilities of the VR WMS complement. Only man with this invention can make the proper judgements with reliability, resolution, flexibility and safety concerning warehousing.

Never again will pickers need to refer back and forth from stacks to a 2-d map, a printed picture image or symbols, numbers and letters describing a stock location. Items now will be selected only by looking directly through superimposed picking data into the warehouse stacks of stock. The 4th System Combination can perform many new levels of functionality that can be added to existing warehouse management software.

All Other Combinations

Every other combination of any of the components can create this VR WMS complement.

INDUSTRIAL APPLICABILITY

The overall concept of any part of this VR WMS complement is the ability to transform the data of numbers and letters describing a location of a stock location system into data that is visualized three dimensions and in real time and is communicated quickly and easily into the human eye.

Since warehousing is highly dependent on the knowledge of warehouse locations, this VR WMS complement communicates all warehousing functions to the human eye in three dimensions allowing for multiple warehousing improvements.

This VR WMS complement will be very vital in the food distribution industry, where high costs of warehouse buildings and the need to avoid rot and spoilage are key factors. This VR WMS complement will be implemented globally and help eliminate world famine and increase food distribution efficiency.

Other industries that will use this VR WMS complement are those that have SKUs that are always in need and constantly moving in the logistics cycle. This VR WMS complement is not limited to conventional warehouses but used for any other type of storage. Any industry that ships goods can use this VR WMS complement. Logistics, distribution, supply chain, and warehouse organization leaders will find new uses and capabilities of this VR WMS complement as it is used.

We claim:

1. A system for enhancing a warehouse management system comprising: a virtual reality technology means comprising means for processing computer generated graphics imagery refreshed at a selected realtime or non-realtime update rate by computing a three dimensional perspective view of a supply chain surroundings or location from a viewpoint in a three dimensional world said viewpoint comprising roll, pitch, yaw or heading, coordinate information in relation to a central coordinate location where when said viewpoint changes an entire new image being calculated, created and displayed, whereby advances to ones of a warehousing, logistics, distribution and supply chain industry occur.

2. The system of claim 1 wherein said virtual reality technology means comprises:
   a) an image generator system comprising means for generating visual warehouse management system imagery;
   b) an image generator system host computer for commanding said image generator system, said image generator system host computer including means for processing data to said image generator system;
   c) a human eye interface for displaying generated imagery by said image generator system for viewing by a human eye;
   d) a warehouse management system for locating stock items within supply chain operations of an organization; and
   e) an interface to a host warehouse management system for integrating data from said warehouse management system to said image generator system host computer by translating the data into a form that said image generator system host computer understands, thus commanding said image generator system.

3. The system of claim 2 further comprising a simulated warehouse database for investigating warehouse management system issues, said simulated warehouse database including means to create said simulated warehouse database.

4. The system of claim 2 further comprising means to create hardcopy images from said human eye interface visualizations.

5. The system of claim 2 further comprising means for manipulating image generator system warehouse management system graphics and its internal elements.

6. The system of claim 2 wherein said human eye interface comprises a non see through head mounted display for presenting image generator system warehouse management system graphics directly in front of the human eye.

7. The system of claim 2 wherein said human eye interface comprises a see through head mounted display for presenting image generator system graphics directly in front of the human eye onto a transparent lens focused into infinity allowing a user to focus into a distance and see selected said image generator system warehouse management system graphics.

8. The system of claim 2 wherein said human eye interface comprises a hand held display system for presenting image generator system warehouse management system graphics.

9. The system of claim 2 wherein said human eye interface comprises a head down display system for presenting image generator system warehouse management system graphics.

10. The system of claim 2 wherein said human eye interface comprises a head up display system for presenting image generator system graphics onto a transparent material allowing a user to see into a distance with selected said image generator system warehouse management system graphics.

11. The system of claim 2 wherein said human eye interface comprises a projection system for projecting image generator system graphics onto projection screens, domes, or other media surrounding a user for immersing said user in said image generator system warehouse management system graphics.

12. The system of claim 2 further comprising tracking and positioning systems that are integrated into said image generator system host computer allowing mobility for said human eye interface by transferring this positioning data to said image generator system host computer and having corresponding said image generator system warehouse management system graphics simultaneously correlate with an exterior real world of the warehousing, logistics, distribution and supply chain industry.

13. The system of claim 1 wherein said coordinate information is Cartesian coordinate information and said central coordinate location is an x=0, y=0, z=0 Cartesian coordinate location.

14. A method of system for enhancing ones of a warehousing, logistics, distribution and supply chain industry comprising: a virtual reality technology means comprising means for processing computer generated graphics real time imagery refreshed at an update rate above one hertz by computing a three dimensional perspective view of a supply chain surroundings or location from a viewpoint in a three dimensional world said viewpoint comprising roll, pitch, yaw or heading, coordinate information in relation to a central coordinate location where when said viewpoint changes an entire new image being calculated, created and displayed, whereby advances to the warehousing, logistics, distribution and supply chain industry occur.

15. The system of claim 14 wherein said virtual reality technology means comprises:
   a) an image generator system comprising means for generating real time visual warehousing, logistics, distribution and supply chain industry imagery;
   b) an image generator system host computer for commanding said image generator system, said image generator system host computer including means for processing data to said image generator system; and
   c) a human eye interface for displaying generated warehousing, logistics, distribution and supply chain industry imagery by said image generator system for viewing by a human eye.

16. The system of claim 15 further comprising a warehouse management system for locating stock items within supply chain operations of an organization, said warehouse management system including an interface to a host warehouse management system for integrating data from said warehouse management system to said image generator system host computer by translating the data into a form that said image generator system host computer understands, thus commanding said image generator system.

17. The system of claim 15 further comprising a simulated warehouse database for investigating warehousing, logistics, distribution and supply chain industry issues, said simulated warehouse database including means to create said simulated warehouse database.

18. The system of claim 15 further comprising means to create hardcopy images from said human eye interface visualizations.

19. The system of claim 15 further comprising means for manipulating image generator system warehousing, logistics, distribution and supply chain industry imagery and its internal elements.

20. The system of claim 15 wherein said human eye interface comprises a non see through head mounted display for presenting image generator system warehousing, logistics, distribution and supply chain industry graphics directly in front of the human eye.

21. The system of claim 15 wherein said human eye interface comprises a see through head mounted display for presenting image generator system graphics directly in front of the human eye onto a transparent lens focused into infinity allowing a user to focus into a distance and see selected said image generator system warehousing, logistics, distribution and supply chain industry graphics.

22. The system of claim 15 wherein said human eye interface comprises a hand held display system for presenting image generator system warehousing, logistics, distribution and supply chain industry graphics.

23. The system of claim 15 wherein said human eye interface comprises a head down display system for presenting image generator system warehousing, logistics, distribution and supply chain industry graphics.

24. The system of claim 15 wherein said human eye interface comprises a head up display system for presenting image generator system graphics onto a transparent material allowing a user to see into a distance with selected said image generator system graphics.

25. The system of claim 15 wherein said human eye interface comprises a projection system for projecting image generator system graphics onto projection screens, domes, or other media surrounding a user for immersing said user in said image generator system warehousing, logistics, distribution and supply chain industry graphics.

26. The system of claim 15 further comprising tracking and positioning systems that are integrated into said image generator system host computer allowing mobility for said human eye interface by transferring positioning data to said image generator system host computer and having corresponding said image generator system warehousing, logistics, distribution and supply chain industry graphics simultaneously correlate with an exterior real world of the warehousing, logistics, distribution and supply chain industry.

27. The system of claim 14 wherein said coordinate information is Cartesian coordinate information and said central coordinate location is an x=0, y=0, z=0 Cartesian coordinate location.

* * * * *